SELECTOR MATRIX CHECK CIRCUIT

Filed March 31, 1965 2 Sheets-Sheet 1

INVENTOR
D. W. HUFFMAN
BY
Charles Scott Phelan
ATTORNEY

Aug. 5, 1969 D. W. HUFFMAN 3,460,093

SELECTOR MATRIX CHECK CIRCUIT

Filed March 31, 1965 2 Sheets-Sheet 2

United States Patent Office 3,460,093

Patented Aug. 5, 1969

3,460,093

SELECTOR MATRIX CHECK CIRCUIT

Donald W. Huffman, Shrewsbury, N.J., assignor to Bell Telephone Laboratories, Incorporated, New York, N.Y., a corporation of New York Filed Mar. 31, 1965, Ser. No. 444,346
Int. Cl. G11b *29/00;* G11c *5/02, 5/06*
U.S. Cl. 340—166 6 Claims

ABSTRACT OF THE DISCLOSURE

Toroidal magnetic cores are coupled to individual row and column coordinate circuits, respectively, of an access matrix to be switched by drive current in their respective circuits. A separate core-inhibiting current path for total drive current links all row cores in common and all column cores in common, and in opposite sense with respect to individual coordinate circuit linkages, during drive operations so that only cores coupled to selected coordinate circuits receive balanced flux and are, therefore, not set during a drive operation. If a circuit fault causes drive current division to energize nonselected coordinate circuits, cores receiving part of the divided current experience unbalanced flux and are set. A subsequent interrogation pulse applied to all cores initiates a fault indication if it does not set one row core and one column core corresponding to the selected coordinate circuits.

Figure 1:
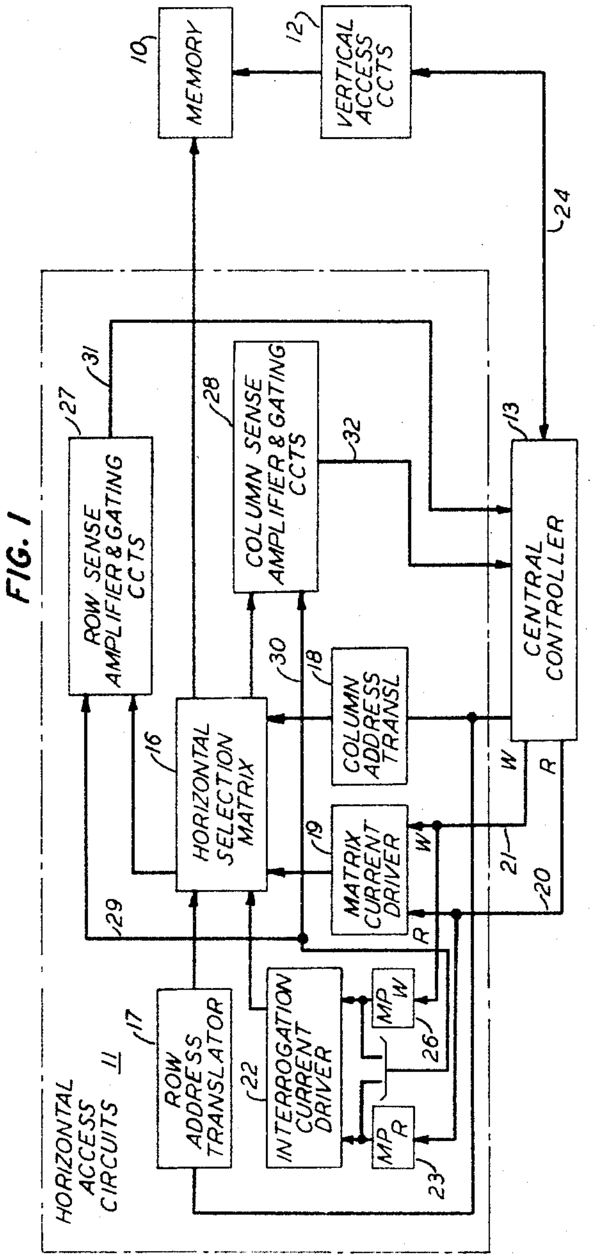

This invention relates to data processing systems, and in particular it relates to an arrangement for checking the operation of a selection matrix associated with a memory in such a system.

In data processing systems a large memory is often employed for storing data and program instructions which control a processor. Selection matrices are often utilized to reduce the cost of access circuit hardware for coupling input-output circuits to different selectable memory locations. Such a selection matrix and the memory to which it is coupled are advantageously operated on coincident current principles. A typical coincident current memory system may include a horizontal selection matrix and a vertical selection matrix for supplying two half-select currents in coincidence for operating storage means at a selected address in the memory. Each of those selection matrices includes coordinate row and column circuits that can be coupled to the memory system address translating circuits so that only one row circuit and one column circuit of each matrix are normally energized for coupling a drive current pulse to a single crosspoint load thereof. Each selection matrix crosspoint load is a coordinate drive circuit of the memory, which may, for example, be a magnetic memory.

Certain faults that occur in the matrix or in the address translating circuits create a shunt current conduction path within the matrix which diverts drive current from a selected crosspoint load thereof. The shunting reduces the drive current supplied to the selected crosspoint load, i.e., the corresponding memory coordinate drive circuit. This type of faulty operation may adversely affect the operation of memory devices at the selected location. For example, it may cause plural memory locations to be selected and thereby produce an indefinite read-out from the memory or possibly destroy information in a memory location where no write-in is to be accomplished.

Selection matrices for memories in data processing systems are oftentimes not directly checked in the course of normal system maintenance routines. Some systems, however, check the matrix operation indirectly by means of a programmed sequence of operations in which the contents of certain memory locations are placed in temporary storage while special test words are written into their memory locations and thereafter read out for comparison with known data. The comparing operation is designed to indicate whether or not there has been faulty writing or reading in the memory as a result of one or more faults in the selection matrices. After the mentioned maintenance operations have been completed the temporarily stored data is replaced in the memory. This type of maintenance surveillance of a memory and its access circuits requires a great deal of processor time, and it must be repeated at regular intervals in order to insure the integrity of the memory. After a fault has been detected, the appropriate equipment must be taken out of service and further programmed test routines accomplished in order to identify the particular part of the equipment which requires service.

It is therefore one object of the present invention to reduce the amount of data processor time which is required for maintenance operations associated with processor memory circuits.

Another object is to check the operation of a selection matrix by direct means which require a minimum amount of processor program time.

Still another object of the invention is to check the operation of a selection matrix on a substantially continuous basis so that faults evidenced in the operation of the matrix may be detected and isolated soon after they occur.

These and other objects of the invention are realized in an illustrative embodiment in a selection matrix for a magnetic memory by detecting the presence of a fault as evidenced by the presence of current in nonselected matrix coordinates, as well as in the selected matrix coordinates. Separate impedance devices are coupled to the respective coordinate circuits of a matrix and utilized to indicate a division of drive current. In one partcular embodiment of the invention the impedances are bistable magnetic check cores coupled to the matrix coordinate circuits to be switched in response to an imbalance between the total drive current supplied to the matrix and the amount of drive current supplied to the particular coordinate circuit associated with such check core.

It is one feature of the invention that the check core arrangement detects a matrix fault at any nonselected matrix crosspoint which is associated with a selected coordinate circuit of the matrix.

It is another feature of the invention that the check cores associated with nonselected row and column circuits are all switched by a matrix drive pulse, and after such drive pulse all check cores are interrogated to determine whether or not a core on a selected matrix coordinate had also been switched by the drive pulse thereby indicating the occurrence of a fault.

Another feature is that the selection matrix check core arrangement automatically monitors the operation of both the selection matrix and the translation circuits coupled to such matrix.

A further feature is that the matrix is tested during each read or write operation of the memory by the application of normal matrix operating signals and independently of the character of the read-out from the associated memory array.

Still another feature of the invention is that the matrix check cores have coercive force requirements which are satisfied by currents that are very much smaller than the memory half-select current supplied to the memory by the matrix.

A further feature is that the check core arrangement for selection matrices is dependent upon the type of impedance network which a selection matrix presents to its drive current source regardless of the magnitude of the output current from such source.

Figure 2:
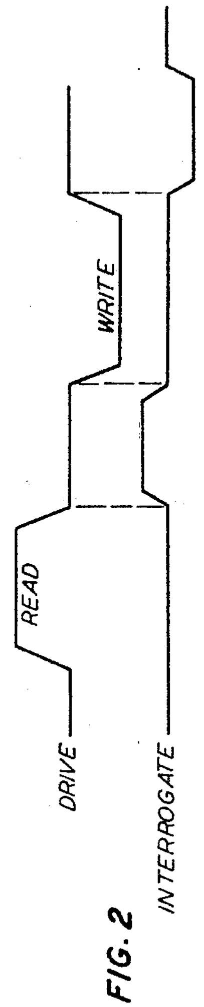
Figure 3:
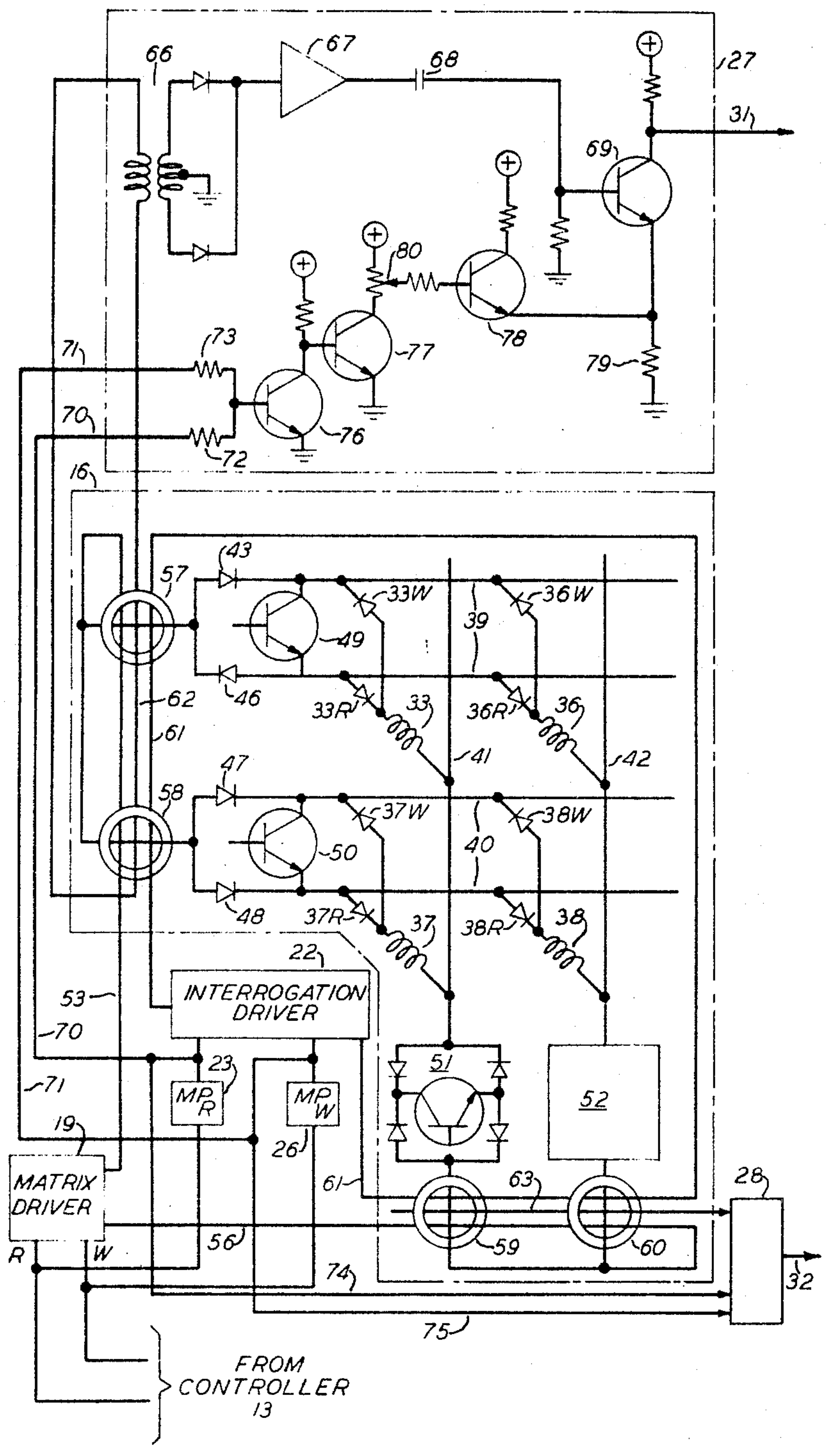

The aforementioned features and objects of the invention, as well as other features and objects, will be better understood upon a consideration of the following detailed description and the appended claims in connection with the attached drawing of an illustrative embodiment in which:

FIG. 1 is a simplified block and line diagram of a data processing system utilizing the present invention;

FIG. 2 includes signal wave diagrams illustrating the operation of the invention; and FIG. 3 is a schematic diagram of a typical selection matrix utilizing the present invention.

The data processing system illustrated in FIG. 1 includes a coincident current magnetic memory 10 which is provided with horizontal access circuits 11 and vertical access circuits 12 for supplying control signals to selectable memory addresses in response to address and control information signals. Since the access circuits 11 and 12 are essentially the same, only the horizontal circuit 11 is illustrated in detail. Control signals are supplied by a central controller 13 for the data processing system. The controller 13 is advantageously a stored program data processor, many forms of which are well known in the art.

The horizontal access circuits 11 include a horizontal selection matrix 16 which is illustrated in detail in FIG. 3. Address information from central controller 13 is supplied to the matrix 16 through a row address translator 17 and a column address translator 18 of a type well known in the art. The translators convert binary coded addresses to one-out-of-*n* type of coding for actuating a selection matrix. The address translators enable a particular row and column of the selection matrix 16 to receive drive current pulses which are supplied from a matrix current driver 19. The driver 19 receives read and write actuating signals from the central controller 13 by means of a read circuit 20 and a write circuit 21. Driver 19 supplies read and write signals of opposite polarities to matrix 16 as shown in FIG. 2, and the magnitude of those pulses is sufficient to couple half-select signals to row circuits of memory 10.

In accordance with the present invention the signals on the circuits 20 and 21 are also utilized, after appropriate delay, to actuate an interrogation current driver 22. The delay is provided by monopulsers 23 and 26 for the read and write signals, respectively. Driver 22 supplies an interrogation pulse after each output pulse from the driver 19 and with the same polarity, but smaller magnitude, as illustrated in FIG. 2. Thus, the interrogation pulses are bipolar and are supplied to matrix check cores, as will be described in connection with FIG. 3, during the normal time guard interval left between read and write drive pulses to allow the memory to settle down. Sense amplifier and gating circuits 27 and 28 are provided for indicating the response of the row and column check cores, respectively, to the interrogation pulses. Strobing signals are supplied on circuits 29 and 30 from the monopulsers 23 and 26 to enable the operation of the amplifier and gating circuits 27 and 28 during only interrogation times. Outputs from the circuits 27 and 28 are coupled by circuit connections 31 and 32 to the central controller 13 for signaling the detection of a fault in the selection matrix or in one of its address translators. The controller then removes the matrix or translator from service for diagnostic scanning to identify the faulty portion of the circuit.

Vertical access circuits 12 are similar to the horizontal circuits 11 in arrangement and operation for supplying half-select drive signals, as in FIG. 2, to a selected column circuit of memory 10. A bidirectional connection 24 schematically represents all of the connections between controller 13 and the circuits 12.

FIG. 3 illustrates in part the access circuits 11 of FIG. 1 with additional schematic detail of the amplifier and gating circuit 27 and of the selection matrix 16. The matrix 16 is illustrated as a 2 x 2 array for convenience in demonstrating the operation of the invention. However, much larger arrays are advantageously employed in the same fashion. Crosspoint loads 33, 36, 37 and 38 are illustrated and interconnect different combinations of matrix row circuits 39 and 40 and column circuits 41 and 42. Each of the row circuits is a bipolar bus for accommodating both read and write drive signals of opposite polarities as shown in FIG. 2. Two diodes 43 and 46 in the row bus 39 steer drive signals to an appropriate path of the bus 39, and similar steering diodes 47 and 48 are included in the row bus 40.

Each of the crosspoint loads 33, 36, 37, and 38 in the matrix 16 is a different row drive circuit of the coincident current memory 10 in FIG. 1. Each such crosspoint load has one terminal connected to one of the column circuits and has its other terminal connected to the two paths of a row bus of the selection matrix through oppositely poled diodes. Thus, the diodes 33R and 33W connect the crosspoint load 33 to the row circuit 39. Similarly designated diodes couple the other load circuits to their corresponding row circuits. Each pair of such diodes comprises, with the steering diodes of the row circuit to which it is connected, a bridge type gating circuit. Drive current pulses are applied across one diagonal of such a gating circuit and a transistor switch is connected across the other diagonal of the gating circuit.

Thus, the transistors 49 and 50 are connected in the gating circuits for the row buses 39 and 40, respectively, with their collector and emitter electrodes connected to the two paths of the respective row circuits. The base electrodes of the transistors 49 and 50 are coupled by circuits, not shown, to the output connections of the row address translator 17 in FIG. 1. Only one of the transistors 49 or 50 is normally enabled at a time to enable the transmission of signals in the corresponding row bus in a manner which is well known in the art. Similar bridge gating circuits 51 and 52 are provided for the column circuits 41 and 42, respectively, and are enabled by signals from the column address translator 18 in FIG. 1. During normal operation one row circuit and one column circuit, with their interconnected crosspoint load, are coupled in series across the output of the matrix driver 19.

The driver 19 has two output leads 53 and 56 which are common to all possible drive paths through the matrix 16. The circuit 53 is coupled to the matrix row circuits in multiple and the circuit 56 is coupled to the column circuits in multiple. Accordingly, when more than one row circuit or more than one column circuit is enabled, there are plural drive current paths through the matrix.

In accordance with the present invention a plurality of impedances are coupled to the matrix row and column circuits, respectively, for use in detecting the presence of a coordinate drive current that can be much smaller than the total matrix drive current. In FIG. 3 these impedances are bistable magnetic devices in the form of the toroidal check cores 57, 58, 59, and 60. Each of the check cores is individually linked to a different one of the row or column circuits in one sense for a given polarity of drive current pulse. The common drive circuit 53 is also linked to the row check cores 57 and 58 in opposite sense with respect to the linking of the individual row circuits therein. Similarly, the common drive circuit 56 is linked to the column check cores 59 and 60 in opposite sense with respect to the linking of the individual column circuits therein.

During normal operation of the access circuits a drive current pulse of either read or write polarity switches all of the nonselected check cores from one of their stable conditions to the other because such cores are subjected to a single magnetomotive force of corresponding polarity from the common drive circuits linking such cores. However, the check cores associated with a selected row or column circuit are not so switched because they receive a similar magnetomotive force from a common drive circuit linking them, and they also receive a magnetomotive force of similar magnitude but of opposite polarity from the same drive current pulse flowing in the individual selected row or column circuit.

For example, assume that the crosspoint load 37 is to receive a read-out drive pulse and a subsequent write-in drive pulse, and assume further that all check cores are in a reset condition with counterclockwise remnent magnetization. The address translators enable the transistor 50 in row 40 and the corresponding transistor in the bridge gating circuit 51 of the column 41. The positive read pulse is coupled by common drive circuit 53 through check cores 58 and 57 in one sense tending to set such cores to their clockwise remanent magnetization state. The same pulse is also coupled by row circuit 40 through the core 58 in opposite sense tending to produce counterclockwise magnetization in core 58. Since the numbers of turns on a core for its common drive circuit linkage and its individual coordinate circut linkage are the same, core 57 is switched to its set condition and core 58 remains in its reset condition.

The drive current pulse is further coupled through bridge diode 47, transistor 50, diode 37R, load 37, and bridge gating circuit 51. From that gating circuit 51 the column circuit 41 couples the drive pulse through the check core 59 to the common drive circuit 56 which couples the same drive pulse through the core 60 and through the core 59 in opposite sense with respect to the coupling of column circuit 41. The pulse then returns to driver 19. Core 59 remains undisturbed but core 60 is switched because it receives only the single drive magnetomotive force in the setting direction. During a subsequent write-in drive pulse of opposite polarity the cores 57 and 60 are reset, and the cores 58 and 59 again remain undisturbed by the drive pulse. This write-in pulse travels through the common drive circuit 56 linking cores 59 and 60. In the column circuit 41 the pulse links core 59 in opposite sense and passes through gating bridge 51 in column circuit 41, and from there it is coupled through the load 37, diode 37W, transistor 50, steering diode 48 and core 58. From the core 58 the write-in pulse is coupled by the common drive circuit 53 through the cores 57 and 58 back to driver 59.

Further in accordance with the invention the interrogation driver 22 has an output circuit 61 which loops through all of the row cores 57 and 58 and all of the column cores 59 and 60. As previously described in connection with FIG. 1, each interrogation pulse from the driver 22 follows a drive pulse from the driver 19 in point of time and is of the same polarity as the preceding drive pulse. However, the interrogation pulses on the circuit 61 are of much smaller magnitude than are the drive pulses supplied by driver 19, as can be seen in FIG. 2. These small interrogation pulses are of adequate magnitude to switch the check cores linked thereby because such cores have narrow hysteresis loops defining their set and reset remanent magnetic flux conditions. Thus, the cores require only a relatively small coercive magnetomotive force as compared to the half-select magnetomotive force required for operation of the memory 10.

Alternate interrogation pulses from the driver 22 set any of the row or column check cores which had not theretofore been set by the preceding read pulse from the driver 19, and intermediate interrogation pulses from driver 22 reset any check cores which had not been theretofore reset by a write pulse from the driver 19. During normal operation when only one row and one column circuit receive drive current in a read-write cycle, one row check core and one column check core remain unswitched by each matrix drive pulse. During the time guard interval following such a drive pulse the interrogation pulse of the same polarity causes such check cores on selected coordinate row and column circuits to be switched. The switching of selected check cores on interrogation produces a signal of corresponding polarity in a row sensing circuit 62 which couples all of the row check cores to the row sense amplifier and gating circuit 27. Similarly a column sensing circuit 63 couples interrogation output signals to column amplifier and gating circuits 28. The row sensing circuit 62 and gating circuit 27 are illustrated in detail and the corresponding column circuits, which are illustrated in simplified form, are similar.

The row sensing circuit 62 is coupled to the terminals of the primary winding of a transformer 66 which has a center tapped secondary winding. A well known full wave rectifying connection is employed to couple the secondary winding terminals and center tap to the input of a linear sensing amplifier 67 so that interrogation signals induced in sensing circuit 62 by the switching of a check core on a selected row circuit activate the amplifier 67 regardless of the read or write polarity of the preceding drive pulse. The output of amplifier 67 is connected through a capacitor 68 to the base electrode of a transistor 69 which is arranged in a common emitter amplifier stage. In the circuit of transistor 69, and elsewhere in the drawing, circled polarity signs schematically indicate the connection of a potential source of the indicated polarity and which has another terminal connected to ground.

Conduction in transistor 69 is controlled by threshold circuits, to be described, so that the output to lead 31 at the collector electrode of transistor 69 is disabled during read or write drive times. If amplifier 67 receives no input signal from transformer 66, its output to the capacitor 68 is at a low potential level, transistor 69 cannot conduct, and a fault is indicated at interrogation time. However, if amplifier 67 receives a positive input signal it supplies a positive-going potential signal through capacitor 68 to initiate conduction in the transistor 69 if threshold conditions have been otherwise satisfied to enable the transistor. The resulting drop in potential at lead 31 indicates satisfactory matrix operation.

A thresholding function is included in each of the amplifier and gating circuits and detail for this function is shown in the circuit 27. Two leads 70 and 71 couple the outputs of monopulsers 23 and 26 through resistors 72 and 73 to the base electrode of a transistor 76. Leads 70 and 71 correspond to the circuit 29 in FIG. 1. The same monopulser outputs are coupled by leads 74 and 75, corresponding to the circuit 30 in FIG. 1, to the circuit 28. Transistor 76 is arranged in a common emitter amplifier stage to conduct only in response to a positive signal from either of the monopulsers during the read or write drive interval and to be nonconducting at all other times. The output from the collector electrode of transistor 76 is coupled through two further common emitter amplifier stages including two transistors 77 and 78 to the emitter electrode of transistor 69. An emitter resistor 79 is shared by transistor 69 and 78. A tap 80 is included in the coupling from the collector circuit of transistor 77 to transistor 78 for adjustably biasing the latter transistor.

When transistor 76 is conducting during a read or write interval, transistor 77 is biased off; and the transistor 78 has a high forward bias. Transistor 78 conducts heavily through resistor 79 to hold transistor 69 biased off. During interrogation intervals transistor 76 is off and transistors 77 and 78 are on. However, in the latter situation the conduction in transistor 78 is at a lower level because its base electrode is adjustably tapped to an intermediate point on the collector resistor of transistor 77.

The tap 80 is set so that the potential developed across resistor 79 when transistor 77 conducts will permit transistor 69 to conduct in response to the switching of a check core during an interrogation interval. However, tap 80 is also arranged so that transistor 60 cannot conduct in response to shuttle noises coupled thereto in response to interrogation but in the absence of check core switching. In other words, the threshold circuits described provide an adjustable threshold against noise, and they also provide means to prevent false read-out to controller 13 during drive intervals.

Certain faults which may occur in the address translators 17 and 18, or in the matrix 16, effectively change the impedance which the matrix presents to the matrix driver 19. Such faults provide a shunt circuit path for diverting drive current away from a selected crosspoint load in the drive current path. Insofar as such faults affect the operation of the check cores 57 through 60 they are detected by such cores in accordance with the present invention. Some typical faults are hereinafter outlined to illustrate further the manner of operation of the invention.

Assume a fault in the row address translator 17. In this case the signals from central controller 13 to that translator direct a selection of the crosspoint load 37. However, the translator fault causes both of the row transistors 49 and 50 to be enabled instead of only one of them. This permits drive current from driver 19 to flow in the row circuit 39 as well as the row circuit 40 which was the only one intended for selection. In a memory system in which the crosspoint loads are the drive circuits of a memory, the information content of the various memory locations linked by a drive circuit affects the inductive reactance of such drive circuit. Accordingly, the system normally includes a constant current source as the matrix driver 19 so that a uniform drive pulse of substantially constant configuration is supplied to every crosspoint load regardless of its information content. Accordingly, the constant current pulse supplied by driver 19, at the time of the aforementioned fault causing dual row selection, is split between rows 39 and 40. However, the splitting does not occur until after the pulse has passed through the check cores 57 and 58 in the common drive circuit 53. Half of the energy of the drive current pulse appears in each of the row circuits and is, of course, less than the energy coupled to the check cores by the common drive circuit 53. Accordingly, both of the check cores 57 and 58 are switched by the drive pulse.

The two portions of the drive current flow through steering diodes 43 and 47, transistors 49 and 50, diodes 33R and 37R, and the two crosspoint loads 33 and 37, to the column circuit 41. The two drive current pulse portions are recombined in column circuit 41 and flow through the gating bridge 51, core 59, and common drive circuit 56, back to the matrix driver 19. In this latter portion of the circuit check core 59 is undisturbed because it receives substantially equal magnetomotive forces of opposite polarity, but check core 60 is switched because it receives only the magnetomotive force resulting from current flow in the common drive circuit 56. Thus during the drive current pulse both the selected and the nonselected row check cores were switched, but only the nonselected column check core was switched. Now upon the occurrence of the immediately following interrogation pulse from driver 22, no row check cores are switched and only a low voltage signal is coupled by amplifier 67 from the row sensing circuit 62 to the capacitor 68. Consequently, transistor 69 remains nonconducting and the positive output on lead 31 to the central controller 13 indicates a fault affecting a row circuit. The interrogation pulse also links the column check core 59 which was not previously switched and causes it to be switched. A signal is thereby produced in sensing circuit 63 which is coupled to central controller 13 via the amplifier and gating circuit 28 and the connection 32, as previously outlined. This latter signal indicates to the central controller that the column circuits are functioning satisfactorily.

Assume now a different fault in the form of a short, or even a significant reduction in back resistance, in the diode 33W at the same time that the crosspoint load 37 is to be selected for receiving a read drive pulse from driver 19. In addition to the normal drive current path, which has been previously described, through the diode 47, transistor 50, and diode 37R, an additional shunt path is now provided in the row circuit 39 through the diode 43, the shorted diode 33W, and crosspoint load 33. This shunt path causes the drive current to be split between the row circuits 39 and 40 and permits both of the check cores 57 and 58 to be switched during the read drive pulse as previously outlined in the case of a dual row selection. Consequently, the following interrogation pulse from driver 22 can switch no row check cores, and the positive output signal from the transistor 69 indicates to central controller 13 that a fault has occurred.

It will be observed from the last described fault example that a fault in a matrix circuit element will be detected by the check cores when a row or column circuit to which the faulted element is connected is enabled as a selected coordinate of the matrix. It is not necessary that both of the row and column coordinates which are unique to a faulty crosspoint connection must be selected in order to detect the presence of the fault. Thus, a short circuit in a bridge gate transistor such as the transistor 49 affects all of row 39 and would be detected upon the selection of any column circuit together with any row circuit other than row 39.

If a faulty crosspoint load is not directly connected to either of the selected matrix coordinated circuits, the fault will not be detected by the check cores because it shunts only the selected crosspoint load and does not cause current to flow in the portion of a nonselected coordinate circuit which is linked by a check core. Thus, a short in the diode 36W during the occurrence of a write pulse would shunt the selected crosspoint load 37 by permitting current to flow from column circuit 41 through crosspoint load 33, diode 33W, the shorted diode 36W, crosspoint load 36, column circuit 42, crosspoint load 38, diode 38W, and row circuit 40. This fault places the series combination of three crosspoint loads 33, 36, and 38 in parallel with the selected crosspoint load 37; but, insofar as the check cores are concerned, the drive current flows only in row 40 and column 41. Such a fault condition reduces by one-third the amount of drive current supplied to the load 37 and may cause faulty operation at the selected location in the memory 10.

The aforementioned fault in the diode 36W would be eventually detected when either column 42 or row 39 was subsequently selected. However, in the meantime an additional safety factor against erroneous memory operation may be provided by including in the program of central controller 13 a periodically utilized maintenance routine which scans all of the matrix row and column circuits in conjunction with an automatic read and write-back cycle for the memory 10. This program could, for example, every hour check for the presence of such previously undetected faults. The check cores would function as described herein to indicate faults, and the scan routine would, therefore, require substantially less program time than is normally required for a maintenance program of the type previously described which requires the use of a special test word.

Although the present invention has been described in connection with a particular embodiment thereof, additional embodiments and modifications, utilizing the principles of the invention and which will be obvious to those skilled in the art, are included within the spirit and scope of the invention.

What is claimed is:

1. In a selection circuit including a matrix of row and column circuits interconnected at the matrix intersections thereof by crosspoint load means, a source of drive current pulses having the output thereof coupled to said selection circuit, means selecting one of said row circuits and one of said column circuits to receive drive current pulses for energizing the crosspoint load connected therebetween, plural impedance means each coupled to a different one of said row or column circuits to be energized by a drive current pulse in such circuit, and means, including said impedance means, comparing the amplitude of said current in the respective selected row and column circuits with the amplitude of current in the output of said source for producing an indication of an amplitude imbalance for a selected circuit.

2. In a selection matrix including a matrix of row and column circuits interconnected at the intersections thereof by crosspoint load means, and further including means enabling a selected one of said row circuits and a selected one of said column circuits to receive input pulses for energizing the crosspoint load means interconnecting such selected circuits, a fault checking circuit comprising a plurality of row and column check cores each coupled to a different one of said matrix circuits, each of said cores having a hysteresis characteristic defining two stable conditions of remanent flux density of opposite polarity, a source of drive current pulses having a first output lead to which all of said row circuits are connected in multiple, said first lead linking all of said row cores in a sense which opposes in each row check core the influence of said pulses in the row circuit coupled to such core, said source having a second output lead to which all of said column circuits are connected in multiple, said second lead linking all of said column check cores in a sense which opposes in each such column check core the influence of said drive current pulses in the column circuit coupled to such core, switching in check cores of said selected row and column circuits being inhibited by said drive pulses in such selected circuits in the absence of a fault causing division of drive pulse current among more than said selected row and column circuits, each of said check cores being switchable between its stable remanent flux conditions in response to the coupling thereto of a drive current pulse of net magnitude at least equal to a predetermined portion of said drive current pulse magnitude, means applying an interrogation pulse to all of said check cores after each of said drive pulses for switching those of said check cores which had not been switched by such drive pulse, and means indicating whether or not a row check core and a column check core switched in response to said interrogation pulse.

3. In a selection circuit including a matrix of row and column circuits interconnected at the matrix intersections thereof by crosspoint load means, a source of drive current pulses coupled to said selection circuit, means selecting one of said row circuits and one of said column circuits to receive drive current pulses for energizing the crosspoint load connected therebetween, plural impedance means each coupled to a different one of said row or column circuits to be energized by drive current in such circuits, said impedance means comprise a plurality of bistable magnetic devices each coupled in different senses to a different one of said row or column circuits and to the output of said source to be switched from one of its stable conditions to the other in response to a predetermined minimum difference between the total output current of said source and the current in the matrix coordinate circuit to which such device is coupled, and means coupled to said impedance means to indicate current flow in at least one nonselected one of said row or column circuits, said indicating means including means interrogating said devices after each of said drive current pulses to determine whether or not one row device and one column device had been left unswitched by a preceding drive pulse.

4. A selection matrix comprising a source of drive current pulses of predetermined magnitude, a matrix of row and column circuits interconnected at the intersections thereof by crosspoint load means, means enabling a selected one of said row circuits and a selected one of said column circuits to receive drive pulses for energizing the crosspoint load means interconnecting such circuits, means applying said drive current pulses to said matrix, a plurality of row and column check cores each coupled to a different one of said matrix circuits in the same sense, each of said cores having a hysteresis characteristic defining two stable conditions of remanent flux density of opposite polarity and wherein a magnetomotive force substantially less than that produced by one of said drive current pulses is adequate to switch one of said cores between its stable conditions, said applying means including means coupling said drive current pulses to each of said cores in opposite sense with respect to the coupling of such core to its individual matrix circuit whereby substantial equality of drive current in said applying means and in said selected circuits prevents switching of check cores on said selected circuits, means applying an interrogation pulse to all of said check cores after each of said drive pulses for switching those of said check cores which had not been switched by such drive pulse, and means indicating whether or not a row check core and a column check core switched in response to said interrogation pulse.

5. In a selection matrix including a matrix of row and column circuits interconnected at the intersections thereof by crosspoint load means, a source of alternate positive and negative pulses, bilateral gating means enabling a selected one of said row circuits and a selected one of said column circuits to receive input pulses for energizing the crosspoint load means interconnecting such circuits, a plurality of row and column check cores each coupled to a different one of said matrix circuits in the same sense, each of said cores having a hysteresis characteristic defining two stable conditions of remanent flux density of opposite polarity, means applying said pulses to said matrix, each pulse being of sufficient magnitude to switch said cores between their stable conditions, said applying means including means coupling said pulses to all of said check cores in opposite sense with respect to the coupling of each such core to its individual row or column circuit for inhibiting the switching of cores coupled to said selected row and column circuits, means applying an interrogation pulse to all of said check cores after each of said drive pulses and of the same polarity as such drive pulse for switching those of said check cores which had not been switched by such drive pulse, and means indicating whether or not a row check core and a column check core switched in response to said interrogation pulse.

6. The selection matrix in accordance with claim 5 in which said indicating means includes means sensing the switching of one or more of said check cores, and means inhibiting the output from said sensing means for shuttle noises generated by said cores.

References Cited

UNITED STATES PATENTS

| | | | |
|---|---|---|---|
| 3,337,849 | 8/1967 | Lowry | 340—166 |
| 3,172,087 | 3/1965 | Durgin | 340—174 |
| 3,343,143 | 9/1967 | Whiteside | 340—166 XR |
| 3,371,315 | 2/1968 | Huffman et al. | 340—147 XR |

BERNARD KONICK, Primary Examiner

G. M. HOFFMAN, Assistant Examiner

U.S. Cl. X.R.

340—174